United States Patent Office 3,092,650
Patented June 4, 1963

3,092,650
PREPARING ESTERS OF PHOSPHINIC ACIDS
Joseph J. McBride, Jr., La Grange, and Ago Mais, Chicago, Ill., assignors to Armour and Company, Chicago, Ill., a corporation of Delaware
No Drawing. Filed Apr. 20, 1961, Ser. No. 104,265
9 Claims. (Cl. 260—461)

This invention relates to preparing esters of phosphinic acids, and more particularly to a process for preparing esters of disubstituted phosphinic acids $$R_2PO(OH)$$

by the direct reaction of the phosphinic acid or the phosphinic acid chloride with an aliphatic or aromatic hydroxyl-containing compound.

An object of the present invention is to avoid the use of sodium alcoholate and acid chloride or the sodium salt of phosphinic acid and alkyl halide and their attendant difficulties as found in prior esterification processes, while providing a direct reaction of the phosphinic acid or the phosphinic acid chloride when heated with an excess of alcohol. A further object is to provide a process in which an esterification catalyst is employed so as to effect a direct reaction of the phosphinic acid or its chloride with a higher alcohol or phenol. A still further object is to provide a process in which a phosphinic acid or phosphinic acid chloride is reacted with a higher alcohol in the presence of a basic esterification catalyst. Still another object is to provide a process by which a phosphinic acid or its chloride can be esterified with a phenol in the presence of an acidic-type catalyst or a basic-type catalyst. Other specific objects and advantages will appear as the specification proceeds.

In one embodiment of the invention, we heat the phosphinic acid or phosphinic acid chloride with an excess of alcohol at a temperature of at least 160° C. in the presence of a basic esterification catalyst to bring about a direct reaction with a high yield of the ester product. In another embodiment of this invention, phosphinic acid or its acid chloride is treated with an excess of a phenol at a temperature of at least 160° C. in the presence of an acidic or basic esterification catalyst to accomplish a direct esterification in high yield.

Any phosphinic acid or phosphinic acid chloride may be employed as a starting material reactant.

Any suitable esterification catalyst may be employed. In the case of aliphatic alcohols, we prefer to employ a basic esterification catalyst, examples of which may be calcium oxide, zinc metal dust, di-butyl tin oxide, etc. A catalytic amount (less than 5%) of the esterification catalyst is used.

In the case of aromatic alcohols, any basic catalyst or acidic catalyst may be employed. Examples of the acidic-type catalysts include p-toluenesulfonic acid, B-naphthol sulfonic acid, etc.

We prefer to employ higher alcohols having boiling points above the reaction mixture temperatures; if desired, however, any alcohol may be used. For example, a lower-boiling alcohol may be used by employing a high-boiling solvent along with the reactants, or some other expedient may be employed involving high temperature addition of the alcohol.

It is theorized that the reaction takes place as follows:

wherein R is an organic group derived from a branched chain olefin, and wherein R' is selected from the group consisting of an aliphatic hydrocarbon radical having from 1 to 22 carbon atoms, a radical consisting of or containing one or more aromatic rings, and mixtures thereof.

Specific examples of the process may be set out as follows:

*Example I*

The phosphinic acid chloride from a C-15 olefin was heated with excess 2-ethylhexyl alcohol in the presence of 0.3 mole percent CaO at 195–206° C. for 72 hours. A 68% yield of the 2-ethylhexyl ester was obtained.

*Example II*

The process was carried out as described in Example I except that zinc dust was employed as the catalyst.

*Example III*

The process was carried out as described in Example I except that the catalyst employed was di-butyl tin oxide.

*Example IV*

The phosphinic acid from a $C_9$ olefin was heated with excess 2-ethylhexyl alcohol and 2.6 mole percent CaO at 193–211° C. for 40 hours. An 87% yield of ester was obtained.

*Example V*

The phosphinic acid from a $C_8$ olefin was heated with excess 2-ethyl hexanol and 2.0 mole percent zinc dust at 200–210° C. for 29 hours. A 97% yield of ester was obtained.

*Example VI*

This process was carried out as described in Example V except that the catalyst employed was dibutyl tin oxide.

*Example VII*

The process was carried out as described in Example V except that CaO was employed as the catalyst.

*Example VIII*

The phosphinic acid from $C_9$ olefin was heated with excess phenol and 1.040 mole percent p-toluenesulfonic acid at 185–250° C. for 164 hours. A 60% yield of the phenyl ester was obtained.

While in the foregoing specification we have set forth specific steps and reactants in considerable detail for the purpose of illustrating the invention, it will be understood that such details may be varied widely by those skilled in the art without departing from the spirit of our invention.

We claim:

1. In a process for preparing esters of phosphinic acids, the steps of heating a substance selected from the group consisting of phosphinic acid and its chloride with an excess of an aliphatic higher alcohol at a reaction temperature of at least 160° C. in the presence of a basic esterification catalyst.

2. The process of claim 1 in which the catalyst is CaO.

3. The process of claim 1 in which the catalyst is zinc metal dust.

4. The process of claim 1 in which the catalyst is di-butyl tin oxide.

5. In a process for preparing esters of phosphinic acids, the steps of heating phosphinic acid with an excess of phenol at a reaction temperature of at least 160° C. in the presence of an esterification catalyst selected from the group consisting of basic and acidic esterification catalysts.

6. The process of claim 5 in which the catalyst is p-toluenesulfonic acid.

7. The process of claim 5 in which the catalyst is B-naphthol sulfonic acid.

8. The process of claim 5 in which the catalyst is CaO.

9. In a process for preparing esters of phosphinic acids, the steps of heating a substance selected from the group consisting of phosphinic acid and its chloride with an excess of an alcohol selected from the group consisting of aliphatic alcohols and phenol, at a reaction temperature of at least 160° C. in the presence of a basic esterification catalyst in the case of the aliphatic alcohol and in the case of the phenol a catalyst selected from the group consisting of basic and acidic esterification catalysts.

References Cited in the file of this patent

UNITED STATES PATENTS

| | | |
|---|---|---|
| 2,653,161 | Ballard et al. | Sept. 22, 1953 |
| 2,659,714 | Harman et al. | Nov. 17, 1953 |